United States Patent
Qiu et al.

(10) Patent No.: US 12,537,787 B2
(45) Date of Patent: Jan. 27, 2026

(54) INFORMATION PROCESSING METHODS, APPARATUS, ELECTRONIC DEVICE AND STORAGE MEDIUM

(71) Applicant: Beijing Zitiao Network Technology Co., Ltd., Beijing (CN)

(72) Inventors: Shi Qiu, Beijing (CN); Wenbin Zhang, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/853,646

(22) PCT Filed: Mar. 30, 2023

(86) PCT No.: PCT/CN2023/084965
§ 371 (c)(1),
(2) Date: Oct. 2, 2024

(87) PCT Pub. No.: WO2023/185981
PCT Pub. Date: Oct. 5, 2023

(65) Prior Publication Data
US 2025/0112882 A1    Apr. 3, 2025

(30) Foreign Application Priority Data
Apr. 2, 2022    (CN) .......................... 202210351974.9

(51) Int. Cl.
*H04L 51/216* (2022.01)
*G06F 40/177* (2020.01)
*G06F 40/30* (2020.01)

(52) U.S. Cl.
CPC .......... *H04L 51/216* (2022.05); *G06F 40/177* (2020.01); *G06F 40/30* (2020.01)

(58) Field of Classification Search
CPC ....... H04L 51/216; G06F 40/177; G06F 40/30
See application file for complete search history.

(56) References Cited

U.S. PATENT DOCUMENTS

8,676,913 B1    3/2014  Roche et al.
9,936,066 B1    4/2018  Mammen et al.
(Continued)

FOREIGN PATENT DOCUMENTS

CN    101094195 A    12/2007
CN    105978792 A     9/2016
(Continued)

OTHER PUBLICATIONS

International Search Report and Written Opinion for PCT/CN2023/084965, mailed Jun. 8, 2023, 15 pages.
(Continued)

*Primary Examiner* — Austin J Moreau
(74) *Attorney, Agent, or Firm* — Astute IP Law Group

(57) ABSTRACT

The present disclosure provides an information processing methods, apparatus, electronic device and storage medium. The information processing method comprises: in response to a new first topic being generated in a first communication group, determining (S11) a first document; and generating (S12) a first record in the first document based on information of the first topic; wherein the first record is associated with the first topic. The present disclosure automatically generates a first record and stores it in the first document. There is no need for manual processing by the user. An association relationship is established between the first topic and the first record, thereby it is easy to find the first topic corresponding to the first record.

17 Claims, 5 Drawing Sheets

(56) References Cited

U.S. PATENT DOCUMENTS

| | | | |
|---|---|---|---|
| 11,310,182 B2* | 4/2022 | Liu | H04L 51/216 |
| 12,047,341 B2* | 7/2024 | Yang | H04L 51/216 |
| 2015/0074194 A1* | 3/2015 | Schabes | H04L 51/52 |
| | | | 709/204 |
| 2017/0123932 A1 | 5/2017 | Goldstein et al. | |
| 2018/0293996 A1 | 10/2018 | Mortis et al. | |
| 2019/0213255 A1 | 7/2019 | Benantar et al. | |
| 2020/0367026 A1* | 11/2020 | Wu | G06T 13/80 |
| 2021/0397639 A1 | 12/2021 | Jacob et al. | |
| 2022/0070234 A1* | 3/2022 | Deole | H04L 65/1069 |

FOREIGN PATENT DOCUMENTS

| | | |
|---|---|---|
| CN | 108243086 A | 7/2018 |
| CN | 109660447 A | 4/2019 |
| CN | 110061909 A | 7/2019 |
| CN | 110321036 A | 10/2019 |
| CN | 112350924 A | 2/2021 |
| CN | 112398727 A | 2/2021 |
| CN | 112838976 A | 5/2021 |
| CN | 113407710 A | 9/2021 |
| CN | 115022272 A | 9/2022 |
| JP | 2017-182296 A | 10/2017 |
| JP | 2020-101866 A | 7/2020 |
| WO | 2020199840 A1 | 10/2020 |

OTHER PUBLICATIONS

Notification to Grant Patent Right for Invention for Chinese Patent Application No. 202210351974.9, mailed Oct. 25, 2023, 5 pages.
Office Action for Chinese Patent Application No. 202210351974.9, mailed May 12, 2023, 12 pages.
Wu, Di, "The Design and Implementation of an Online Multiuser & Multi-tasking Instant Messaging System", College of Information and Electronics Engineering, 2018, 5 pages, with English translation of Abstract.
Zhang et al., "Topic Detection in Instant Messages", 2014 13th International Conference on Machine Learning and Applications, Dec. 3, 2014, 6 pages.
Office Action for Japanese Patent Application No. 2024-558352, mailed on Jul. 29, 2025, 6 pages.

* cited by examiner

INFORMATION PROCESSING METHODS, APPARATUS, ELECTRONIC DEVICE AND STORAGE MEDIUM

CROSS REFERENCE

This is a national stage application based on International Patent Application No. PCT/CN2023/084965, filed Mar. 30, 2023, which claims priority to Chinese patent application No. 202210351974.9, filed on Apr. 2, 2022, entitled "INFORMATION PROCESSING METHOD, APPARATUS, ELECTRONIC DEVICE AND STORAGE MEDIUM", the disclosures of which are incorporated herein by reference in their entireties.

FIELD

The present disclosure relates to a field of computer, and in particular, to an information processing method, apparatus, electronic device and storage medium.

BACKGROUND

Communication software, such as instant messaging software, is generally provided with a communication group, different users in the communication group may communicate with each other and make suggestions or issue tasks.

SUMMARY

The present disclosure provides an information processing methods, apparatus, electronic device and storage medium.

The present disclosure employs the following technical solutions.

In some embodiments, the present disclosure provides an information processing method, comprising: in response to a new first topic being generated in a first communication group, determining a first document; and generating a first record in the first document based on information of the first topic; wherein the first record is associated with the first topic.

In some embodiments, the present disclosure provides an information processing apparatus, comprising: a determining unit configured to, in response to a new first topic being generated in a first communication group, determine a first document; and a recording unit configured to generate a first record in the first document based on information of the first topic, wherein the first record is associated with the first topic.

In some embodiments, the present disclosure provides an electronic device, comprising: at least one memory and at least one processor; wherein the memory is configured to store program code, and the processor is configured to call the program code stored in the memory to execute the above-mentioned method.

In some embodiments, the present disclosure provides a computer-readable storage medium, wherein the computer-readable storage medium is configured to store program code, when run by a processor, the program code causes the processor to execute the above-mentioned method.

The information processing method provided by embodiments of the present disclosure automatically generates a first record and stores it in the first document after the first topic is generated in the first communication group. In this case, there is no need for manual processing by the user, and statistics may be performed automatically. An association relationship is established between the first topic and the first record, thereby it is easy to find the first topic corresponding to the first record.

BRIEF DESCRIPTION OF THE DRAWINGS

The above and other features, advantages and aspects of various embodiments of the present disclosure will become more apparent with reference to the following embodiments in conjunction with the accompanying drawings. Throughout the drawings, the same or similar reference numbers refer to the same or similar elements. It should be understood that the drawings are schematic and that components and elements are not necessarily drawn to scale.

DETAILED DESCRIPTION

Figure 1:
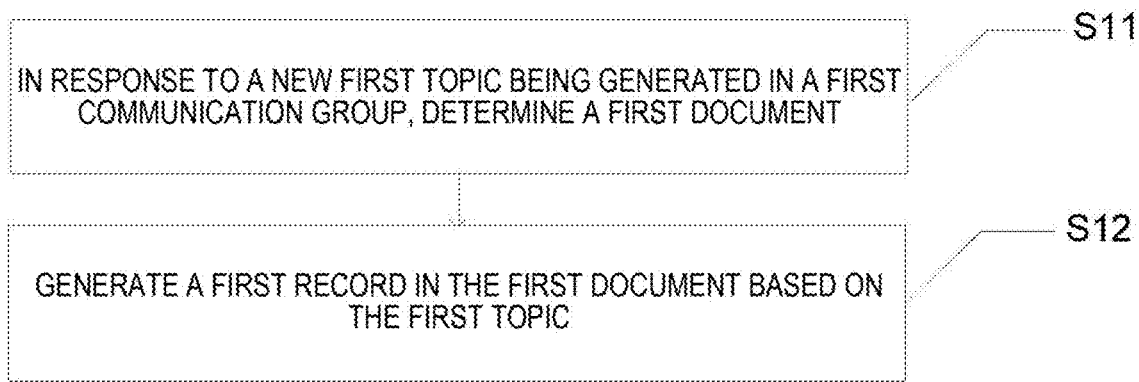
FIG. 1 is a flow chart of an information processing method of an embodiment of the present disclosure.

Embodiments of the present disclosure will be described in more detail below with reference to the accompanying drawings. Although certain embodiments of the disclosure are shown in the drawings, it should be understood that the present disclosure may be implemented in various forms and should not be construed as limited to the embodiments set forth herein, but rather these embodiments are provided for thoroughly and fully understand the present disclosure. It should be understood that the drawings and embodiments of the present disclosure are provided for illustrative purposes only but not intended to limit the scope of the present disclosure.

It should be understood that various steps described in the method implementations of the present disclosure may be executed in different orders and/or in parallel. Furthermore, the method implementations may include additional steps and/or the illustrated steps may be omitted. The scope of the present disclosure is not limited in this regard.

The term "including" and its variations as used herein are non-exclusive inclusion, i.e. "including but not limited to". The term "based on" means "at least partially based on". The term "one embodiment" means "at least one embodiment"; the term "another embodiment" means "at least one additional embodiment"; and the term "some embodiments" means "at least some embodiments". Relevant definitions of other terms will be given in the following description.

It should be noted that the concepts of "first" and "second" mentioned in this disclosure are only used to distinguish different apparatuses, modules, or units, but are not used to limit the order or interdependence of the functions performed by these apparatuses, modules, or units.

It should be noted that the modifications of "one" and "a plurality of" mentioned in this disclosure are illustrative but not limiting. Those skilled in the art should understand that unless otherwise indicated in the context, they should be understood as "one or more".

The names of the messages or information interacted between a plurality of apparatuses in this public implementation are for illustrative purposes only, which are not intended to limit the scope of these messages or information.

The solution provided by embodiments of this application will be described in detail below with reference to the accompanying drawings.

As shown in FIG. 1, FIG. 1 is a flow chart of an information processing method of an embodiment of the present disclosure. The method includes the following steps:

S11: in response to a new first topic being generated in a first communication group, determining a first document; and S12: generating a first record in the first document based on information of the first topic.

In some embodiments, the method proposed in the present disclosure can be applied to instant messaging clients. The first communication group can be a communication group that meets a predetermined condition, or a designated communication group. The number of people in the first communication group is not limited. The first communication group can be a communication group composed of two members, or a communication group composed of three members or more than three members. The first topic can be generated in various ways, such as inputting and publishing the first topic through an information input box of the first communication group, or forwarding topic information published by others to the first communication group to become the first topic. In some embodiments, the topic may be a communication message, and the user may choose whether the communication message to be published is a topic or a non-topic when publishing the communication message. In some embodiments, non-topics that have been published can be turned into topics. For example, for non-topic messages that have been published in the first communication group, users may quote and reply to the non-topic messages to create topics. At this time, the non-topic messages and the reply message by quoting form the topics.

Figure 2:
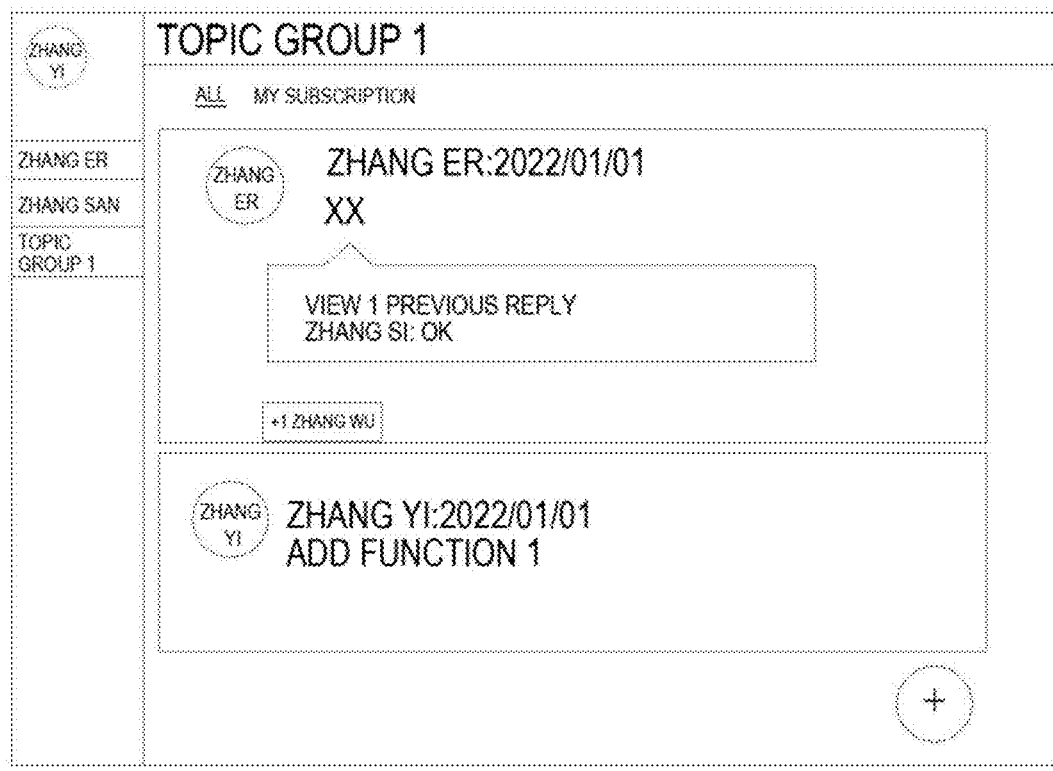
FIG. 2 is a schematic diagram of a first communication group of an embodiment of the present disclosure.
Figure 3:
FIG. 3 is a schematic diagram of a first communication group of an embodiment of the present disclosure.
Figure 4:
FIG. 4 is a schematic diagram of a first communication group of an embodiment of the present disclosure.

The first communication group may be a common group that supports topic messages, that is, both topic messages and non-topic messages can be transmitted in the first communication group. The first communication group may be a topic group in which only topics and replies to topics can be published. The first communication group may also be a group capable of publishing topic and non-topic instant messaging messages. In some embodiments, the reply information of the topic information will be shown under a reply area of the topic information. By viewing the topic information, all the reply information can be viewed without having to find the relevant reply information in the communication group. Please refer to FIG. 2, FIG. 2 illustrates a form of showing topics in topic groups. Instant messaging messages in topic groups are displayed in the form of topics and replies to topics, instead of being displayed in the form of ordinary messages. It can be seen that in the topic group, the user may subscribe to some topics, view all topics or subscribed topics, and the displayed topics may be displayed with controls, such as a like control, reply control, forward control, subscribe control, etc. For topics, the way of publishing topics can be the same as or different from that in ordinary communication groups, topics can be published through a control shown in the lower right corner of FIG. 2 ("a plus sign in the circle"). After triggering the control, a topic publishing interface is displayed and the topic information is input. For a topic, the reply information of the topic may be displayed in a reply area in the topic. For example, in FIG. 2, there are replies under the topic published by "Zhang Er", the reply information is displayed in the reply area, and other users reply under the topic, which enables information aggregation and summary. In other embodiments, FIG. 3 and FIG. 4 illustrates conversation groups that are non-topic groups. Messages can also be aggregated to form topics in conversation groups. Please refer to FIG. 3, in FIG. 3, Zhang Wu replies to a message transmitted by Zhang Er, in which Zhang Wu replies by quoting the previous message instead of by transmitting a message directly in the conversation. At this time, the message transmitted by Zhang Er and the reply by Zhang Wu will become the topic and the reply of the topic. As shown in FIG. 4, if Zhang Wu's reply is triggered, the entire topic and all the replies to the topic can be viewed in the sidebar. It can be seen that the difference between the topic and a general communication message includes that for the topic, aggregation of related messages can be realized. The first document is determined after detecting that the first topic is generated in the first communication group. The first document may be an online document, for example, it may be a group document of the first communication group; the first document may be a text document or a table document. Considering the convenience of recording information, in some embodiments of the present disclosure, the first document is an online table document. When generating the first record based on the information of the first topic, the data that needs to be obtained can be determined in the first document in advance; then the information of the first topic is parsed and the data that needs to be obtained is obtained and then recorded in the first document. The information of the first record may include a publisher, content information, creation time and other related information of the first topic. In some embodiments of the present disclosure, the first record has an association relationship with the first topic, instead of just recording a record in the first document, an association relationship is established between the two. In some embodiments, predetermined operation events can be performed on the first topic, so that the first document is opened and the first record is located, in some embodiments, when the first topic is updated, the first record is updated accordingly.

In some embodiments of the present disclosure, after the first topic is generated in the first communication group, the first record is automatically generated and stored in the first document, thus there is no need to perform manual processing by the user, statistics are automatically performed, and an association relationship is established between the first topic and the first record, making it easy to find the first topic corresponding to the first record.

In some embodiments of the present disclosure, the information processing method further includes: in response to a first operation event on the first record in the first document, opening the first communication group and locating to the first topic.

In some embodiments, the first record has an association relationship with the first topic. After performing the first operation event for the first record, the first topic can be located based on the association relationship, thereby opening the first communication group and locating to the first topic, so as to facilitate the processing personnel to view original information, contextual information, reply information and other related content of the first topic, thus facilitating the processing personnel to process. The first operation event may include one or more operations, for example, it may be a triggering operation on part of the content in the first record, or it may be a specific gesture operation on the first record.

Figure 5:
FIG. 5 is a schematic diagram of a first document of an embodiment of the present disclosure.

For example, please refer to FIG. 2 and FIG. 5, the user Zhang Yi published a first topic in topic group 1 (the first communication group), in which the information content of the first topic is "Add function 1". After determining that the first topic is generated, the first record is generated in an online form as the first document as shown in FIG. 5, which records the publication time, information content, an attachment, a publisher, a communication group, etc. of the first topic, and "View" is provided in the "topic" column. By clicking "View", topic group 1 may be opened and the first topic published by "Zhang Yi" may be located to. In this way, for the processing personnel responsible for processing the topic, when viewing the first record for processing, he/she can locate to the first topic at any time and fully understand the user's true intention without performing a complicated operation of searching for the first topic.

In some embodiments of the present disclosure, a chat robot account is added to the first communication group in advance, and the following is performed by the chat robot account: in response to the new first topic being generated in the first communication group, determining the first document; and generating the first record in the first document based on the information of the first topic. In some embodiments, there may be a plurality of communication groups in the instant messaging client used by the user, but not topics in all of the communication groups need to be collected. Therefore, for the first communication group in which the topics needs to be collected, a chat robot account with a function of recording topic information to a designated document is added therein. The chat robot account triggers steps such as generating a first record after detecting that a new topic appears in the first communication group in which it is located. In some embodiments of the present disclosure, an association relationship between a communication group and a document is set in advance; and determining the first document includes: determining the first document associated with the first communication group based on the association relationship between the communication group and the document. In some embodiments, there may be a plurality of documents and a plurality of communication groups. Topic information in different communication groups may be recorded in different documents.

Therefore, association relationships between different communication groups and documents need to be set in advance. When determining the first document, the first communication group to which the first topic belongs may be determined first, and then the first document associated with the first communication group is obtained based on the association relationship. By setting association relationships between the first communication groups and the first documents, the topics of different communication groups can be stored in separate documents, thereby preventing irrelevant topics from being stored in one document and causing inconvenience to processing personnel. The association relationships between the communication groups and the documents can be stored in the form of a configuration table. In the configuration table, taking row storage as an example, in a row of records, an identifier of the communication group, an identifier of the associated document and an associated document address are stored in different columns. The communication group and the document in a row of records have an association relationship. Of course, column storage may also be used, and in one column record, different contents are stored in different rows respectively. In some embodiments, a chat robot account in a group records the topic information in all groups into the corresponding documents based on the preset association relationships between the communication groups and the documents.

In some embodiments of the present disclosure, one document is associated with one communication group or at least two communication groups, and topics of a plurality of communication groups can be displayed in one document. In accordance with a determination that the first document is associated with at least two communication groups, the first document is displayed with records associated with topics in the at least two communication groups. The first document is displayed with a first control, and the first control is configured to, after being triggered, select a communication group from the at least two communication groups, and display a record associated with a topic of the selected communication group in the first document. In this way, the topic information in the corresponding communication group can be screened in the document to facilitate user's viewing.

Figures 6, 7:
FIG. 6 is a schematic diagram of a first communication group of an embodiment of the present disclosure.
FIG. 7 is a schematic diagram of a first document of an embodiment of the present disclosure.

In some embodiments, the first document can be associated with a plurality of communication groups, as shown in FIG. 7, at this time, the first document is displayed with the records associated to the topics of a plurality of communication groups (Topic Group 1 and Topic Group 2). At the same time, a first control is provided, and the first control can be configured to select part of the communication groups from at least two communication groups. There may be one or a plurality of selected communication groups, and then the record information of the selected communication groups is displayed in the first document. Specifically, the first control can be the lower triangle on the right side of "General Table/All Feedback" in FIG. 7. After triggering the lower triangle, an optional communication group is displayed. After selecting the communication group, the records for the selected communication groups are displayed in the first document.

In some embodiments of the present disclosure, generating the first record in the first document based on the information of the first topic including: determining at least one of the following relevant information based on the information of the first topic: a publication date, information content, an attachment, a publisher, a topic viewing identifier or an identifier of the first communication group; and writing the relevant information into an area corresponding to the first document. In some embodiments, as shown in FIG. 7, taking that the first document is a table as an example, different areas are provided in the first document to store information such as the publication date, the information content, the attachment, the publisher and the topic viewing identifier of the first topic, respectively. The basic information of the first topic is roughly known through the first record.

In some embodiments of the present disclosure, generating the first record in the first document based on the information of the first topic includes: adding information content of the first topic to an information content field of the first record, wherein in response to the information content of the first topic comprises data of a predetermined type, part of the information content other than the data of the predetermined type is added to the information content field, the data of the predetermined type is added to an attachment field of the first record, and the data of the predetermined type is represented by a corresponding placeholder in the information content field based on a position of the data of the predetermined type in the information content.

In some embodiments, the information content of the first record is displayed with the information content of the first topic. Multimedia type content may be inserted into the first topic, or an operation has to be performed to view content. For example, the data of the predetermined type includes at least one of a picture, a video, a information card or a conversation record. At this time, the data of the predetermined type cannot be directly displayed in the first record, but if no content is displayed, the information content will be discontinuous. Therefore, the information content is displayed in the information content field, but the data of the predetermined type in the information content is not displayed. A corresponding placeholder is displayed at the location where the data of the predetermined type is located. Different types of predetermined type data correspond to different placeholders The placeholder may be displayed with a type of the data of the predetermined type. For example, as shown in FIG. 7, the information content in the third row displays "Refer to <conversation record> and <video> to add function 2", where "<conversation record>" and "<video>" are placeholders for conversation record and video respectively. By using the placeholders to indicate the existence of the conversation record and video at this location in the conversation information, avoiding not displaying any content and causing incomprehensibility. In some embodiments, the data of the predetermined type is displayed in the attachment field in an order of appearance in the information content. Please continue to refer to FIG. 7, the attachment column in the third row of FIG. 7 is displayed with conversation records and videos, so that the specific content in the first topic can be determined based on the information content and attachments.

In some embodiments, attachments are displayed in a corresponding attachment field in the first document in an order of appearance in the topic information associated with the first record; in some embodiments, attachments in the first topic are shown sequentially in an area where the attachments are located in an order from top to bottom, from left to right. In some embodiments, if the attachment includes a picture or video, the picture or video is stored in the first document in a format in the first communication group, or the picture or video is converted into a predetermined media format and stored in the first document. The format of the picture or video in the first communication group refers to the format when the picture or video is transmitted to the first communication group, that is, the original format. In other embodiments, in order to ensure storage consistency and avoid compatibility issues, all pictures are converted into a unified predetermined picture format and all videos are converted into a unified predetermined video format and then stored in the first document, ensuring that they can be viewed in the first document.

In some embodiments of the present disclosure, the first document is a multidimensional table, or a multidimensional table is inserted into the first document, and the first record is stored through the multidimensional table. In some embodiments, rows and columns in multidimensional tables are used to store related information according to the type of related information, where related information of one type is stored in one row or one column. In some embodiments, multidimensional tables can record different types of data, including multimedia files such as pictures and videos. Therefore, using multidimensional tables can conveniently store attachments of the first topic in the first document. The rows and columns in the multidimensional table can be one row or one column. Row storage or column storage may be used in multidimensional tables to store corresponding types of data in one row or column. For example, each column in FIG. 5 is used to store different types of data, including publication time, information content, an attachment, etc.

In some embodiments of the present disclosure, generating the first record in the first document based on the information of the first topic includes: including a topic view identifier or an identifier of the first communication group in the first record; the first operation event includes: triggering the topic view identifier or the identifier of the first communication group in the first record. In some embodiments, as shown in FIG. 7, the topic identifier is "View" in the "Topic" column in FIG. 7. A link to the first topic can be stored in the topic identifier, and the topic identifier can be triggered by clicking to open the first communication group and locate to the first topic. In some embodiments, the first document and the first communication group are located in different applications. At this time, when the first topic identifier is triggered, whether to open the application where the first communication group is located will be asked first; and after it is determined to open the application, open the first communication group and locate to the first topic.

In some embodiments of the present disclosure, the method further includes: in response to reply information to the first topic in the first communication group, adding content corresponding to the reply information to the first record of the first document. In some embodiments, the first topic may be replied, and the first record will be updated correspondingly according to the reply information, so that the first record can reflect the reply of the first topic to a certain extent. For example, information such as reply personnel, the number of reply personnel, types of reply messages, etc. may be recorded in the first record.

In some embodiments of the present disclosure, adding the content corresponding to the reply information to the first record of the first document in response to the reply information to the first topic in the first communication group includes: in response to the reply information to the first topic in the first communication group, determining personnel type of reply personnel based on the reply information, and recording content corresponding to the personnel type in the first document; the first topic is an item topic, and the personnel type includes at least one of: personnel who follow an item, personnel who have a similar item, and personnel who complete an item.

In some embodiments, the first topic may be item information such as a proposed demand item, a feedback item, a task item. The items need to be processed, so it is necessary to count associated personnel of the item, such as personnel who follow the item, personnel who complete the item, etc. The personnel who follow the item may be persons responsible for the item. Reply information from different personnel are different, so the personnel type may be judged from the reply information. The content that needs to be recorded for the reply information of personnel of different personnel types can be different, so as to facilitate processing personnel to know opinions or processing information of the personnel of different personnel types on the first topic.

In some embodiments of the present disclosure, determining the personnel type of reply personnel based on the reply information includes: performing semantic recognition on the reply information, and determining the personnel type based on a result of the semantic recognition; or, in accordance with a determination that the reply information is a text message, the personnel type is the personnel who follow an item; in accordance with a determination that the reply information is a first predetermined symbol, the personnel type is the who have a similar item; in accordance with a determination that the reply information is a second predetermined symbol, the personnel type is the personnel who complete an item.

In some embodiments, different types of personnel may use text information or symbols (such as emoticons) to reply. If the text information is used to reply, the semantic recognition can be performed on the text information, and the personnel type of the publisher who published the reply message can be determined based on the recognized semantics. Alternatively, the information replied by different types of the personnel can be set, and the first predetermined symbol and the second predetermined symbol of the reply can be set as specific symbols. For example, please refer to FIG. 6, the first predetermined symbol may be "+1" symbol as shown in FIG. 6. By replying this symbol on the first topic, it indicates that similar items or demands also exist. At this time, the associated personnel "Zhang Wu" is displayed in the "Similar Demands" column in the first document shown in FIG. 7. In some embodiments, the personnel who complete the item of the first topic is also an associated person. For the personnel who complete the item of the first topic, in order to indicate that he has completed the processing of the item of the first topic, he can reply the second predetermined symbol to the first topic. For example, as shown in FIG. 6, "Wang Yi" replied to the first topic with the second predetermined symbol "Done" to indicate that the item of the first topic was completed.

In some embodiments of the present disclosure, recording the content corresponding to the personnel type in the first document includes: in accordance with a determination that the personnel type is the personnel who follow an item, recording a personnel identifier of the reply personnel in a follow-up personnel field of the first document. In some embodiments, as shown in FIG. 7, the follow-up personnel Zhang Si is displayed in the "Follow-up Personnel" column. The personnel identifier may be displayed with personnel information after being triggered, and communication with the personnel corresponding to the personnel identifier may also be established after being triggered.

In some embodiments of the present disclosure, recording the content corresponding to the personnel type in the first document includes: in accordance with a determination that the personnel type is the personnel with a similar item, recording a personnel identifier of the reply personnel in a similar item field of the first document. In some embodiments, as shown in FIG. 7, Zhang Wu is displayed in the "Similar Demands" column, and the personnel identifier may be displayed with personnel information after being triggered, and communication with the personnel corresponding to the personnel identifier may also be established after being triggered.

In some embodiments of the present disclosure, content corresponding to the personnel type is recorded in the first document, including: in accordance with a determination that the personnel type is the personnel who complete an item, recording a personnel identifier of the reply personnel in a completion personnel field of the first document, recording reply time in a completion time field, and recording time that has been taken to complete the item in a period field. In some embodiments, as shown in FIG. 7, Wang Yi is the person who complete the item. The status of the first record is updated in the first document, information about it has been solved is recorded, the person who solved it is Wang Yi, and the time taken for solving it and cycle (time taken for completing the item) are also recorded. By counting information such as status information and completion time of the items, the completion status of respective pieces of item information can be counted, and the efficiency in solving the items can be calculated.

In some embodiments of the present disclosure, for the first record recorded in the first document, when the first topic is updated, such as being replied to or operated, the first record will be updated in response to the update of the first topic. In some embodiments, considering that users may transmit emoticons and other symbols by mistake, the reply message can be called, for example, the second predetermined symbol can be called. The method further includes: in response to the reply information being recalled, deleting content corresponding to the reply information in the first document. For example, Done in FIG. 6 is recalled, and the status information in the first record needs to be modified as not complete, and the completion time and cycle are cleared.

In some embodiments of the present disclosure, when the first record changes, a notification message is transmitted to the person who record in the first record. In some embodiments, the change of the first record is caused by the update of the first topic, at this time, it is necessary to notify users associated to the first topic. For example, when the item of the first topic recorded in the first record is completed, notification information is transmitted to the initiator and associated persons of the first topic (for example, persons who subscribed to or replied to the first topic).

In some embodiments of the present disclosure, the proposed method can be used for users to submit feedback (first topic). After the user submits feedback, the feedback is included in the first document in a form of first record. Through the first document, the user can centrally view the feedback provided by users, view the processing progress, responsible persons and associated personnel of each feedback, view the information content and attachments of the feedbacks, jump back to the location of the original feedback from the first record, and count the time spent after the feedback is processed, so that the user's feedback can be processed in a timely manner and the processing status of each feedback can be known, thereby knowing which feedback has been resolved and which has not been resolved. At the same time, feedback can be transmitted to the first communication group in the form of topics. For users, the information related to the first topic in the first communication group is summarized into the same first topic for viewing. In this way, there is no need to care about irrelevant content in the group, and only your own relevant topics needs to be paid attention to, thereby avoiding the situation where there is too much information in the group and invalid messages need to be checked frequently, and users may also check which users have similar problems or needs, so that similar problems can be solved together.

In some embodiments of the present disclosure, an information processing apparatus is also proposed. The information processing apparatus comprises: a determining unit configured to, in response to a new first topic being generated in a first communication group, determine a first document; and a recording unit configured to generate a first record in the first document based on information of the first topic, wherein the first record is associated with the first topic.

In some embodiments, the information processing apparatus further comprises a control unit configured for, in response to a first operation event for the first record in the first document, opening the first communication group and locating to the first topic.

In some embodiments, a chat robot account is added to the first communication group in advance, and the following is performed by the chat robot account: in response to the new first topic being generated in the first communication group, determining the first document; and generating the first record in the first document based on the information of the first topic.

In some embodiments, an association relationship between a communication group and a document is set in advance; and determining the first document comprises: determining the first document associated with the first communication group based on the association relationship.

In some embodiments, one document is associated with one communication group or at least two communication groups. In some embodiments, in accordance with a determination that the first document is associated with at least two communication groups, the first document is displayed with records associated with topics in the at least two communication groups; and the first document is displayed with a first control, and the first control is configured to, after being triggered, select a communication group from the at least two communication groups, and display a record associated with a topic of the selected communication group in the first document.

In some embodiments, generating the first record in the first document based on the information of the first topic comprises: determining at least one of the following relevant information based on the information of the first topic: a publication date, information content, an attachment, a publisher, a topic viewing identifier or an identifier of the first communication group; and writing the relevant information into an area corresponding to the first document.

In some embodiments, generating the first record in the first document based on information of the first topic comprises: adding information content of the first topic to an information content field of the first record, wherein in response to the information content of the first topic comprises data of a predetermined type, part of the information content other than the data of the predetermined type is added to the information content field, the data of the predetermined type is added to an attachment field of the first record, and the data of the predetermined type is represented by a corresponding placeholder in the information content field based on a position of the data of the predetermined type in the information content.

In some embodiments, the first document is a multidimensional table, or a multidimensional table is inserted into the first document, and the first record is recorded through the multidimensional table. In some embodiments, one or more of the following is satisfied: different types of predetermined type data correspond to different placeholders; the placeholder is displayed with a type of the data of the predetermined type; the data of the predetermined type is displayed in the attachment field in an order of appearance in the information content; the data of the predetermined type comprises at least one of a picture, a video, a information card or a conversation record.

In some embodiments, generating, by the recording unit, the first record in the first document based on the information of the first topic comprises: including a topic view identifier or an identifier of the first communication group in the first record. The first operation event comprises: triggering the topic view identifier or the identifier of the first communication group in the first record.

In some embodiments, the recording unit is further configured for, in response to reply information to the first topic in the first communication group, adding content corresponding to the reply information to the first record of the first document.

In some embodiments, adding the content corresponding to the reply information to the first record of the first document in response to the reply information to the first topic in the first communication group comprising: in response to the reply information to the first topic in the first communication group, determining personnel type of reply personnel based on the reply information, and recording content corresponding to the personnel type in the first document; wherein the first topic is an item topic, and the personnel type comprises at least one of: personnel who follow an item, personnel who have a similar item, and personnel who complete an item.

In some embodiments, determining the personnel type of reply personnel based on the reply information comprising: performing semantic recognition on the reply information, and determining the personnel type based on a result of the semantic recognition; or in accordance with a determination that the reply information is a text message, the personnel type is the personnel who follow an item; in accordance with a determination that the reply information is a first predetermined symbol, the personnel type is the who have a similar item; in accordance with a determination that the reply information is a second predetermined symbol, the personnel type is the personnel who complete an item.

In some embodiments, recording, by the recording unit, the content corresponding to the personnel type in the first document comprising: in accordance with a determination that the personnel type is the personnel who follow an item, recording a personnel identifier of the reply personnel in a follow-up personnel field of the first document; or in accordance with a determination that the personnel type is the personnel with a similar item, recording a personnel identifier of the reply personnel in a similar item field of the first document; or in accordance with a determination that the personnel type is the personnel who complete an item, recording a personnel identifier of the reply personnel in a completion personnel field of the first document, recording reply time in a completion time field, and recording time that has been taken to complete the item in a period field.

In some embodiments, the recording unit is further configured for, in response to the reply information being recalled, deleting content corresponding to the reply information in the first document.

For apparatus embodiments, since they basically correspond to the method embodiments, please refer to the description of the method embodiments for relevant information. The apparatus embodiments described above are only illustrative, and the modules described as separate modules may or may not be separate. Some or all of the modules may be selected according to actual needs to achieve the purpose of the solutions of this embodiment. Those skilled in the art may understand and implement the method without any creative effort.

The method and apparatus of the present disclosure have been described above based on the embodiments and application examples. In addition, the present disclosure also provides an electronic device and a computer-readable storage medium. The electronic device and computer-readable storage media are described below.

Figure 8:
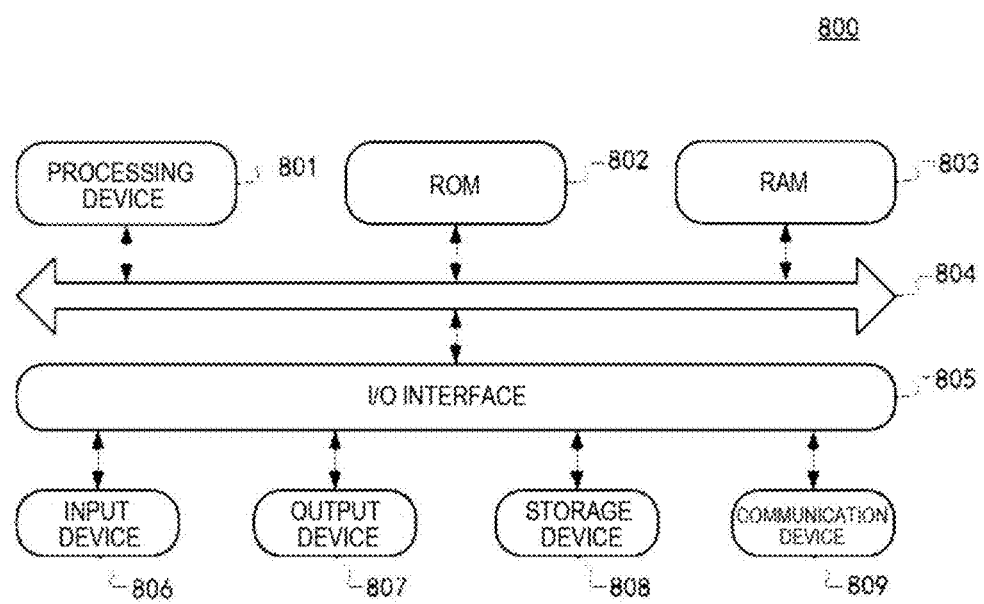
FIG. 8 is a schematic structural diagram of an electronic device of an embodiment of the present disclosure.

Referring to FIG. 8 below, it is a structural schematic diagram of an electronic device 800 (such as terminal device or server) suitable for implementing the embodiment of the present disclosure. The terminal device in the embodiment of the present disclosure may include but is not limited to mobile terminals such as mobile phones, laptops, digital broadcast receivers, PDAs (Personal Digital Assistants), PADs (tablet computers), PMPs (portable multimedia players), car-mounted terminals (such as car navigation terminals), etc. and fixed terminals such as digital TVs (television), desktop computers, etc. The electronic device shown in the drawings is only an example and should not bring any limitation on the functionality and scope of use of the embodiment of the present disclosure.

The electronic device 800 may include a processing device (such as a central processing unit, graphics processing unit, etc.) 801, which may perform various appropriate actions and processes based on programs stored in Read-Only Memory (ROM) 802 or loaded from storage device 808 into Random Access Memory (RAM) 803. In the RAM 803, various programs and data necessary for the operation of the electronic device 800 are also stored. The processing device 801, ROM 802, and RAM 803 are connected to each other through a bus 604. An Input/Output I/O interface 805 is also connected to the bus 804.

Typically, the following devices can be connected to I/O interface 805: input devices 806 including, for example, touch screens, touchpads, keyboards, mice, cameras, microphones, accelerometers, gyroscopes, etc.; output devices 807 including liquid crystal displays (LCDs), speakers, vibrators, etc.; storage devices 808 including magnetic tapes, hard disks, etc.; and a communication device 809. The communication device 809 may allow the electronic device 800 to communicate with other devices wirelessly or wirelessly to exchange data. Although an electronic device 800 with a plurality of devices is shown in the drawings, it shall be understood that it is not required to implement or have all of the devices shown. More or fewer devices can be implemented or provided instead.

In particular, according to embodiments of the present disclosure, the process described above with reference to the flowchart can be implemented as a computer software program. For example, an embodiment of the present disclosure includes a computer program product that includes a computer program carried on a computer-readable medium, where the computer program includes program code for performing the method shown in the flowchart. In such an embodiment, the computer program can be downloaded and installed from a network through the communication device 809, or installed from the storage device 808, or installed from the ROM 802. When the computer program is executed by the processing device 801, the above functions defined in the method of the embodiment of the present disclosure are performed.

It should be noted that the computer-readable medium described above in the present disclosure may be a computer-readable signal medium or a computer-readable storage medium, or any combination thereof. The computer-readable storage medium can be, for example, but not limited to, an electrical, magnetic, optical, electromagnetic, infrared, or semiconductor system, apparatus, or device, or any combination thereof. Specific examples of computer-readable storage media may include but are not limited to: an electrical connection with one or more wires, a portable computer disk, a hard disk, random access memory (RAM), read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium containing or storing a program that can be used by an instruction execution system, apparatus, or device, or can be used in combination with an instruction execution system, apparatus, or device. In the present disclosure, a computer-readable signal medium can include a data signal propagated in baseband or as part of a carrier wave, which carries computer-readable program code therein. Such propagated data signals may take many forms, including but not limited to electromagnetic signals, optical signals, or any suitable combination thereof. A computer-readable signal medium may also be any computer-readable medium other than a computer-readable storage medium, which can send, propagate, or transmit programs for use by or in conjunction with instruction execution systems, apparatuses, or devices. The program code contained on the computer-readable medium may be transmitted using any suitable medium, including but not limited to: wires, optical cables, RF (radio frequency), etc., or any suitable combination thereof.

In some embodiments, clients and servers can communicate using any currently known or future developed network protocol such as HTTP (Hyper Text Transfer Protocol), and can be interconnected with any form or medium of digital data communication (such as communication networks). Examples of communication networks include local area networks ("LANs"), wide area networks ("WANs"), inter-networks (such as the Internet), and end-to-end networks (such as ad hoc end-to-end networks), as well as any currently known or future developed networks.

The computer-readable medium can be included in the electronic device, or it can exist alone without being assembled into the electronic device.

The above-mentioned computer-readable medium carries one or more programs, and when the above-mentioned one or more programs are executed by the electronic device, the electronic device executes the above method of the present disclosure.

Computer program codes for performing the operations of the present disclosure may be written in one or more programming languages or a combination thereof, including Object Oriented programming languages—such as Java, Smalltalk, C++, and also conventional procedural programming languages—such as "C" or similar programming languages. The program code may be executed entirely on the user's computer, partially executed on the user's computer, executed as a standalone software package, partially executed on the user's computer and partially on a remote computer, or entirely on a remote computer or server. In the case of involving a remote computer, the remote computer may be any kind of network—including local area network (LAN) or wide area network (WAN)—connected to the user's computer, or may be connected to an external computer (e.g., through an Internet service provider to connect via the Internet).

The flowcharts and block diagrams in the accompanying drawings illustrate the architecture, functions, and operations of possible implementations of the system, method, and computer program product according to various embodiments of the present disclosure. In this regard, each block in a flowchart or block diagram may represent a module, program segment, or portion of code that contains one or more executable instructions for implementing a specified logical function. It should also be noted that in some alternative implementations, the functions marked in the blocks may occur in a different order than those marked in the drawings. For example, two consecutive blocks may actually be executed in parallel, or they may sometimes be executed in reverse order, depending on the function involved. It should also be noted that each block in the block diagrams and/or flowcharts, as well as combinations of blocks in the block diagrams and/or flowcharts, may be implemented using a dedicated hardware-based system that performs the specified function or operations, or may be implemented using a combination of dedicated hardware and computer instructions.

The units described in the embodiments of the present disclosure may be implemented by means of software or hardware, and the name of the unit does not constitute a limitation on the unit itself in a certain case.

The functions described herein above can be performed at least in part by one or more hardware logic components. For example, without limitation, exemplary types of hardware logic components that may be used include: Field Programmable Gate Arrays (FPGAs), Application Specific Integrated Circuits (ASICs), Application Specific Standard Parts (ASSPs), System on Chip (SOCs), Complex Programmable Logic Devices (CPLDs), and so on.

In the context of this disclosure, a machine-readable medium can be a tangible medium that may contain or store programs for use by or in conjunction with instruction execution systems, apparatuses, or devices. A machine-readable medium may be a machine-readable signal medium or a machine-readable storage medium. A machine-readable medium may include, but are not limited to, electronic, magnetic, optical, electromagnetic, infrared, or semiconductor systems, apparatuses, or devices, or any suitable combination thereof. Specific examples of the machine-readable storage medium may include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination thereof.

According to one or more embodiments of the present disclosure, an information processing method is provided. The method comprises: in response to a new first topic being generated in a first communication group, determining a first document; and generating a first record in the first document based on information of the first topic; wherein the first record is associated with the first topic.

According to one or more embodiments of the present disclosure, an information processing method is provided. The method further comprises: in response to a first operation event for the first record in the first document, opening the first communication group and locating to the first topic.

According to one or more embodiments of the present disclosure, an information processing method is provided. A chat robot account is added to the first communication group in advance, and the following is performed by the chat robot account: in response to the new first topic being generated in the first communication group, determining the first document; and generating the first record in the first document based on the information of the first topic.

According to one or more embodiments of the present disclosure, an information processing method is provided. An association relationship between a communication group and a document is set in advance; and determining the first document comprises: determining the first document associated with the first communication group based on the association relationship.

According to one or more embodiments of the present disclosure, an information processing method is provided. One document is associated with one communication group or at least two communication groups.

According to one or more embodiments of the present disclosure, an information processing method is provided. In accordance with a determination that the first document is associated with at least two communication groups, the first document is displayed with records associated with topics in the at least two communication groups; and the first document is displayed with a first control, and the first control is configured to, after being triggered, select a communication group from the at least two communication groups, and display a record associated with a topic of the selected communication group in the first document.

According to one or more embodiments of the present disclosure, an information processing method is provided. Generating the first record in the first document based on the information of the first topic comprises: determining at least one of the following relevant information based on the information of the first topic: a publication date, information content, an attachment, a publisher, a topic viewing identifier or an identifier of the first communication group; and writing the relevant information into an area corresponding to the first document.

According to one or more embodiments of the present disclosure, an information processing method is provided. Generating the first record in the first document based on information of the first topic comprises: adding information content of the first topic to an information content field of the first record, wherein in response to the information content of the first topic comprises data of a predetermined type, part of the information content other than the data of the predetermined type is added to the information content field, the data of the predetermined type is added to an attachment field of the first record, and the data of the predetermined type is represented by a corresponding placeholder in the information content field based on a position of the data of the predetermined type in the information content.

According to one or more embodiments of the present disclosure, an information processing method is provided. The first document is a multidimensional table, or a multidimensional table is inserted into the first document, and the first record is recorded through the multidimensional table.

According to one or more embodiments of the present disclosure, an information processing method is provided. The method comprises one or more of the following: different types of predetermined type data correspond to different placeholders; the placeholder is displayed with a type of the data of the predetermined type; the data of the predetermined type is displayed in the attachment field in an order of appearance in the information content; the data of the predetermined type comprises at least one of a picture, a video, a information card or a conversation record.

According to one or more embodiments of the present disclosure, an information processing method is provided. Generating the first record in the first document based on the information of the first topic comprises: including a topic view identifier or an identifier of the first communication group in the first record; the first operation event comprises: triggering the topic view identifier or the identifier of the first communication group in the first record.

According to one or more embodiments of the present disclosure, an information processing method is provided. The method further comprises in response to reply information to the first topic in the first communication group, adding content corresponding to the reply information to the first record of the first document.

According to one or more embodiments of the present disclosure, an information processing method is provided. Adding the content corresponding to the reply information to the first record of the first document in response to the reply information to the first topic in the first communication group comprises: in response to the reply information to the first topic in the first communication group, determining personnel type of reply personnel based on the reply information, and recording content corresponding to the personnel type in the first document; wherein the first topic is an item topic, and the personnel type comprises at least one of: personnel who follow an item, personnel who have a similar item, and personnel who complete an item.

According to one or more embodiments of the present disclosure, an information processing method is provided. Determining the personnel type of reply personnel based on the reply information comprising: performing semantic recognition on the reply information, and determining the personnel type based on a result of the semantic recognition; or in accordance with a determination that the reply information is a text message, the personnel type is the personnel who follow an item; in accordance with a determination that the reply information is a first predetermined symbol, the personnel type is the who have a similar item; in accordance with a determination that the reply information is a second predetermined symbol, the personnel type is the personnel who complete an item.

According to one or more embodiments of the present disclosure, an information processing method is provided. Recording the content corresponding to the personnel type in the first document comprising: in accordance with a determination that the personnel type is the personnel who follow an item, recording a personnel identifier of the reply personnel in a follow-up personnel field of the first document; or in accordance with a determination that the personnel type is the personnel with a similar item, recording a personnel identifier of the reply personnel in a similar item field of the first document; or in accordance with a determination that the personnel type is the personnel who complete an item, recording a personnel identifier of the reply personnel in a completion personnel field of the first document, recording reply time in a completion time field, and recording time that has been taken to complete the item in a period field.

According to one or more embodiments of the present disclosure, an information processing method is provided. The personnel type is the personnel who complete an item. The method further comprises: in response to the reply information being recalled, deleting content corresponding to the reply information in the first document.

According to one or more embodiments of the present disclosure, an information processing apparatus is provided. The information processing apparatus comprises: a determining unit configured to, in response to a new first topic being generated in a first communication group, determine a first document; and a recording unit configured to generate a first record in the first document based on information of the first topic, wherein the first record is associated with the first topic.

According to one or more embodiments of the present disclosure, an electronic device is provided. The electronic device comprises: at least one memory and at least one processor; wherein the at least one memory is configured to store program code, and the at least one processor is configured to call the program code stored in the at least one memory to execute any of the above-described methods.

According to one or more embodiments of the present disclosure, a computer-readable storage medium is provided, wherein the computer-readable storage medium is configured to store program code, when run by a processor, the program code causes the processor to execute the above-described methods.

The above description is only embodiments of this disclosure and an explanation of the technical principles used.

Those skilled in the art should understand that the scope of the disclosure involved in this disclosure is not limited to technical solutions composed of specific combinations of the above technical features, but should also covers other technical solutions formed by arbitrary combinations of the above technical features or their equivalent features without departing from the above disclosure concept. For example, technical solutions formed by replacing the above features with (but not limited to) technical features with similar functions disclosed in this disclosure.

In addition, although multiple operations are depicted in a specific order, this should not be understood as requiring these operations to be performed in the specific order shown or in a sequential order. In certain environments, multitasking and parallel processing may be advantageous. Similarly, although multiple implementation details are included in the above discussion, these should not be construed as limiting the scope of the present disclosure. Some features described in the context of individual embodiments can also be implemented in combination in a single embodiment. Conversely, multiple features described in the context of a single embodiment can also be implemented in multiple embodiments separately or in any suitable sub-combination.

Although the subject matter has been described in language specific to structural features and/or methodological logical actions, it should be understood that the subject matter defined in the appended claims is not necessarily limited to the specific features or actions described above. On the contrary, the specific features and actions described above are merely example forms of implementing the claims.

We claim:

1. An information processing method, comprising:
generating, in response to a first topic being generated in a first communication group,
a first record in a first document based on information of the first topic, wherein the first record is associated with the first topic; and
in response to a first operation event for the first record in the first document, opening the first communication group and locating to the first topic,
wherein an association relationship between a communication group and a document is set in advance; and determining the first document comprises: determining the first document associated with the first communication group based on the association relationship,
wherein generating the first record in the first document based on information of the first topic comprises:
adding information content of the first topic to an information content field of the first record, wherein in response to the information content of the first topic comprises data of a predetermined type, part of the information content other than the data of the predetermined type is added to the information content field, the data of the predetermined type is added to an attachment field of the first record, and the data of the predetermined type is represented by a corresponding placeholder in the information content field based on a position of the data of the predetermined type in the information content.

2. The method of claim 1, wherein a chat robot account is added to the first communication group in advance, and the following is performed by the chat robot account: generating, in response to the first topic being generated in the first communication group, the first record in the first document based on the information of the first topic.

3. The method of claim 1, wherein,
one document is associated with one communication group or at least two communication groups.

4. The method of claim 3, wherein,
in accordance with a determination that the first document is associated with at least two communication groups, the first document is displayed with records associated with topics in the at least two communication groups; and
the first document is displayed with a first control, and the first control is configured to, after being triggered, select a communication group from the at least two communication groups, and display a record associated with a topic of the selected communication group in the first document.

5. The method of claim 1, wherein generating the first record in the first document based on the information of the first topic comprises:
determining at least one of the following relevant information based on the information of the first topic: a publication date, information content, an attachment, a publisher, a topic viewing identifier or an identifier of the first communication group; and
writing the relevant information into an area corresponding to the first document.

6. The method of claim 1, wherein the first document is a multidimensional table, or a multidimensional table is inserted into the first document, and the first record is recorded through the multidimensional table.

7. The method of claim 1, wherein the method comprises one or more of the following: different types of predetermined type data correspond to different placeholders;
the placeholder is displayed with a type of the data of the predetermined type;
the data of the predetermined type is displayed in the attachment field in an order of appearance in the information content;
the data of the predetermined type comprises at least one of a picture, a video, a information card or a conversation record.

8. The method of claim 1, wherein,
generating the first record in the first document based on the information of the first topic comprises: including a topic view identifier or an identifier of the first communication group in the first record;
the first operation event comprises: triggering the topic view identifier or the identifier of the first communication group in the first record.

9. The method of claim 1, further comprising:
in response to reply information to the first topic in the first communication group, adding content corresponding to the reply information to the first record of the first document.

10. The method of claim 8, wherein adding content corresponding to reply information to the first record of the first document in response to the reply information to the first topic in the first communication group comprises:
in response to the reply information to the first topic in the first communication group, determining personnel type of reply personnel based on the reply information, and recording content corresponding to the personnel type in the first document;
wherein the first topic is an item topic, and the personnel type comprises at least one of: personnel who follow an item, personnel who have a similar item, and personnel who complete an item.

11. The method of claim 10, wherein,
determining the personnel type of reply personnel based on the reply information comprising: performing semantic recognition on the reply information, and determining the personnel type based on a result of the semantic recognition;
or
in accordance with a determination that the reply information is a text message, the personnel type is the personnel who follow an item; in accordance with a determination that the reply information is a first predetermined symbol, the personnel type is the who have a similar item; in accordance with a determination that the reply information is a second predetermined symbol, the personnel type is the personnel who complete an item.

12. The method of claim 10, wherein recording the content corresponding to the personnel type in the first document comprising:
in accordance with a determination that the personnel type is the personnel who follow an item, recording a personnel identifier of the reply personnel in a follow-up personnel field of the first document; or
in accordance with a determination that the personnel type is the personnel with a similar item, recording a personnel identifier of the reply personnel in a similar item field of the first document; or
in accordance with a determination that the personnel type is the personnel who complete an item, recording a personnel identifier of the reply personnel in a completion personnel field of the first document, recording reply time in a completion time field, and recording time that has been taken to complete the item in a period field.

13. The method of claim 9, further comprising: in response to the reply information being recalled, deleting content corresponding to the reply information in the first document.

14. An electronic device, comprising:
at least one memory and at least one processor;
wherein the at least one memory is configured to store program code, and the at least one processor is configured to call the program code stored in the at least one memory to perform acts comprising:
generating, in response to a first topic being generated in a first communication group,
a first record in a first document based on information of the first topic, wherein the first record is associated with the first topic; and
in response to a first operation event for the first record in the first document, opening the first communication group and locating to the first topic,
wherein an association relationship between a communication group and a document is set in advance; and
determining the first document comprises: determining the first document associated with the first communication group based on the association relationship,
wherein generating the first record in the first document based on information of the first topic comprises:
adding information content of the first topic to an information content field of the first record, wherein in response to the information content of the first topic comprises data of a predetermined type, part of the information content other than the data of the predetermined type is added to the information content field, the data of the predetermined type is added to an attachment field of the first record, and the data of the predetermined type is represented by a corresponding placeholder in the information content field based on a position of the data of the predetermined type in the information content.

15. The electronic device of claim 14, wherein a chat robot account is added to the first communication group in advance, and the following is performed by the chat robot account: generating, in response to the first topic being generated in the first communication group, the first record in the first document based on the information of the first topic.

16. The electronic device of claim 14, wherein,
one document is associated with one communication group or at least two communication groups.

17. A non-transitory computer-readable storage medium, wherein the computer-readable storage medium is configured to store program code, when run by a processor, the program code causes the processor to perform acts comprising:
generating, in response to a first topic being generated in a first communication group,
a first record in a first document based on information of the first topic, wherein the first record is associated with the first topic; and
in response to a first operation event for the first record in the first document, opening the first communication group and locating to the first topic,
wherein an association relationship between a communication group and a document is set in advance; and determining the first document comprises: determining the first document associated with the first communication group based on the association relationship,
wherein generating the first record in the first document based on information of the first topic comprises:
adding information content of the first topic to an information content field of the first record, wherein in response to the information content of the first topic comprises data of a predetermined type, part of the information content other than the data of the predetermined type is added to the information content field, the data of the predetermined type is added to an attachment field of the first record, and the data of the predetermined type is represented by a corresponding placeholder in the information content field based on a position of the data of the predetermined type in the information content.

* * * * *